Patented Sept. 4, 1928.

1,683,493

UNITED STATES PATENT OFFICE.

SAMUEL S. SADTLER, OF SPRINGFIELD TOWNSHIP, MONTGOMERY COUNTY, PENNSYLVANIA, ASSIGNOR TO AMIESITE ASPHALT COMPANY OF AMERICA, OF PHILADELPHIA, PENNSYLVANIA, A CORPORATION OF NEW JERSEY.

ROAD COMPOSITION AND METHOD OF MAKING SAME.

No Drawing.   Application filed March 24, 1926.   Serial No. 97,143.

The principal object of this invention is to provide a novel and improved method for making bitumen road compositions.

In the manufacture of certain types of asphaltic or bitumen road compositions, it is sometimes desirable prior to adding the bitumen to coat a mineral aggregate with a bitumen liquefier and with hydrated lime or similar material having the effect of strengthening the asphalt. I have discovered that by forming an emulsion of the liquefier and lime or equivalent material, with water that I can secure a better distribution of the lime throughout the asphalt-coated aggregate and also can hold the liquefier advantageously at the surface of the stone better than if the solvent is used separately.

In making this preparation, I find it necessary to employ an emulsion in which the liquefier oil is the continuous element, or what is known as a "water-in-oil" emulsion. I have further found it highly desirable to employ relatively small amounts of water in forming my emulsion and relatively large amounts of matter, such as the lime, relatively insoluble both in water and in the solvent.

As an example of my method, I may first place in a suitable agitator the liquefier to be used, which preferably is slowly volatile and which may be a heavy naphtha. In an agitator capable of making about a ton of coated aggregate, I may use about one and one-half gallons of the naphtha. To this naphtha I add while under agitation about three and one-half fluid ounces of oleic or other fatty acid, and after this is thoroughly mixed in I add dry freshly slaked lime. Although I prefer the freshly slaked lime, commercial hydrate of lime may be used. The lime which is added in powdered form is thoroughly incorporated in the mix. and then water is added slowly to complete the emulsion. Where other than lime, such as whiting, is used as the mineral matter, I preferably add prior to the whiting a small amount of calcium hydrate to form, with the oleic acid, calcium oleate, which has the property of aiding in the formation of the water-in-oil emulsion. The amount of lime employed may be approximately two pounds of a good grade of fat lime, preferably of high calcium content or containing magnesia, and the total added amount of water about one quart and a half including the amount taken up by the lime when slaked. After agitating the mass for a few minutes, the emulsion is completed.

I have found that the lime distributed in this emulsion stands up well for use within a reasonable time without further agitation, but if it has to stand a day or more, a slight amount of additional agitation easily distributes the lime throughout the emulsion.

In forming the bitumen road composition, I add this emulsion in suitable quantity to a suitable stone aggregate and thoroughly mix it in, and thereafter add the bitumen which may be in the form of asphalt and preferably is added at a temperature of approximately 240° F. Following incorporation of the asphalt and the thorough mixing, the composition may be laid on the road in any desired manner and compressed to form the road surface, the particles of water segregated throughout the bitumen being expressed from the mass.

I claim:

1. The method of forming a road composition, which consists in taking a mineral aggregate, mixing with said aggregate a water-in-oil emulsion of a bitumen liquefier carrying a mineral filler, and thereafter coating the aggregate with bitumen.

2. The method of forming a road composition, which consists in taking a mineral aggregate, mixing with said aggregate a water-in-oil emulsion of a slowly soluble bitumen liquefier carrying a mineral filler, and thereafter coating the aggregate with bitumen.

3. The method of forming a road composition, which comprises taking a bitumen liquefier, mixing therewith fatty acid, thereafter adding mineral filler, and finally adding water in sufficient quantity to form a water-in-oil emulsion with the liquefier, incorporating this emulsion with a stone aggregate, and thereafter adding a bitumen.

4. The method of forming a road composition, which comprises taking a bitumen liquefier, mixing therewith oleic acid, thereafter adding mineral filler, and finally adding water in sufficient quantity to form a water-in-oil emulsion with the liquefier, incorporating this emulsion with a stone aggregate, and thereafter adding a bitumen.

5. The method of forming a road composition, which comprises making a water-in-oil emulsion of a bitumen liquefier, containing slowly soluble alkaline earth containing substance, mixing a stone aggregate with said emulsion, and thereafter adding bitumen.

6. The method of forming a road composition, which comprises taking a bitumen liquefier, mixing therewith fatty acid, thereafter adding an alkaline earth containing substance of slow solubility, and finally adding water in sufficient quantity to form a water-in-oil emulsion with the liquefier, incorporating this emulsion with a stone aggregate, and thereafter adding a bitumen.

7. The method of forming a road composition, which comprises taking a bitumen liquefier, mixing therewith oleic acid, thereafter adding an alkaline earth containing substance of slow solubility, adding water in sufficient quantity to form a water-in-oil emulsion with the liquefier, incorporating this emulsion in a stone aggregate, and thereafter adding a bitumen.

8. The method of forming a road composition, which comprises taking a bitumen liquefier, mixing therewith lime and oleic acid, thereafter adding mineral filler, and finally adding water in sufficient quantity to form a water-in-oil emulsion with the liquefier, incorporating this emulsion in a stone aggregate, and thereafter adding a bitumen.

SAMUEL S. SADTLER.